United States Patent
John Wilson et al.

(10) Patent No.: US 11,277,174 B2
(45) Date of Patent: Mar. 15, 2022

(54) CHANNEL STATE FEEDBACK COMPUTATION AND BEAM TRAINING FOR FULL-DUPLEX COMMUNICATION

(71) Applicant: QUALCOMM Incorporated, San Diego, CA (US)

(72) Inventors: Makesh Pravin John Wilson, San Diego, CA (US); Tao Luo, San Diego, CA (US); Jung Ho Ryu, Fort Lee, NJ (US); Kiran Venugopal, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 16/736,003

(22) Filed: Jan. 7, 2020

(65) Prior Publication Data
US 2020/0220585 A1    Jul. 9, 2020

Related U.S. Application Data

(60) Provisional application No. 62/790,161, filed on Jan. 9, 2019.

(51) Int. Cl.
*H04B 7/0417* (2017.01)
*H04L 25/02* (2006.01)
*H04L 5/00* (2006.01)
*H04B 7/06* (2006.01)
*H04B 7/0456* (2017.01)

(52) U.S. Cl.
CPC ......... *H04B 7/0417* (2013.01); *H04B 7/0486* (2013.01); *H04B 7/0617* (2013.01); *H04B 7/0626* (2013.01); *H04B 7/0632* (2013.01); *H04L 5/0051* (2013.01); *H04L 25/0226* (2013.01)

(58) Field of Classification Search
CPC .. H04B 7/0417; H04B 7/0486; H04B 7/0617; H04B 7/0626; H04B 7/0632; H04L 5/0051; H04L 25/0226
See application file for complete search history.

(56) References Cited

U.S. PATENT DOCUMENTS

2018/0287757 A1* 10/2018  Onggosanusi ........ H04L 5/0053
2019/0174527 A1*  6/2019  Park .................. H04L 25/03343

OTHER PUBLICATIONS

Samsung ("Resolving TBD on CSI-RS resource for non-codebook based transmission" 3GPP Draft: R1-1801957, 3GPP TSG RAN WG1 Meeting #92, Athens, Greece, Feb. 26-Mar. 2, 2018) (Year: 2018).*
International Search Report and Written Opinion—PCT/US2020/012711—ISA/EPO—dated Apr. 21, 2020.

* cited by examiner

*Primary Examiner* — Jaison Joseph
(74) *Attorney, Agent, or Firm* — Patterson+ Sheridan, L.L.P.

(57) ABSTRACT

Aspects of the present disclosure relate to wireless communications, and more particularly, to channel state operations using full-duplex communication. One example method generally includes receiving at least one channel state information-reference signal (CSI-RS) from a base station, transmitting at least one sounding reference signal (SRS) to the base station, wherein the CSI-RS is received simultaneously with the transmission of the at least one SRS, and transmitting, to the base station, at least one channel state feedback message comprising channel state information based on the at least one CSI-RS.

34 Claims, 11 Drawing Sheets

900

| Base Station CSI-RS Tx Beam | UE CSI-Rs Rx Beam | SRS Tx Beam | Example Use Case |
|---|---|---|---|
| Fixed | Fixed | Fixed | CQI Computation |
| Refine | Fixed | Fixed | P2 refinement in fixed self-interference |
| Fixed | Refine | Fixed | P3 refinement - increase SNR and reduce interference |
| Fixed | Fixed | Refine/Sweep | Sweep SRS to reduce self-interference. Base station may be signaled subset of SRS resources/PMI for further indication. |
| Fixed | Refine | Refine | Joint optimization at UE |
| Refine/Sweep | Fixed | Refine | |
| Refine/Sweep | Refine | Fixed | |

FIG. 9

CHANNEL STATE FEEDBACK COMPUTATION AND BEAM TRAINING FOR FULL-DUPLEX COMMUNICATION

CROSS-REFERENCE TO RELATED APPLICATIONS

This application claims benefit of U.S. Provisional Patent Application Ser. No. 62/790,161, filed Jan. 9, 2019, which is expressly incorporated herein by reference in its entirety.

INTRODUCTION

Aspects of the present disclosure relate to wireless communications, and more particularly, to channel state feedback and beam training operations.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication. The method generally includes receiving at least one channel state information-reference signal (CSI-RS) from a base station, transmitting at least one sounding reference signal (SRS) to the base station, wherein the CSI-RS is received simultaneously with the transmission of the at least one SRS, and transmitting, to the base station, at least one channel state feedback message comprising channel state information based on the at least one CSI-RS.

Certain aspects provide a method for wireless communication. The method generally includes transmitting at least one CSI-RS to a UE, receiving at least one SRS from the UE, wherein the SRS is received simultaneously with the transmission of the CSI-RS, generating at least one channel sounding feedback message based on the at least one SRS, and transmitting, to the UE, at least one channel sounding feedback message based on the at least one SRS.

Certain aspects provide an apparatus for wireless communication. The apparatus generally includes a memory, and a processor coupled to the memory, the processor and the memory being configured to receive at least one CSI-RS from a base station, transmit at least one SRS to the base station, wherein the CSI-RS is received simultaneously with the transmission of the at least one SRS, and transmit, to the base station, at least one channel state feedback message comprising channel state information based on the at least one CSI-RS.

Certain aspects provide an apparatus for wireless communication. The apparatus generally includes a memory and a processor coupled to the memory, the processor and the memory being configured to transmit at least one CSI-RS to a UE, receive at least one SRS from the UE, wherein the SRS is received simultaneously with the transmission of the CSI-RS, and transmit, to the UE, at least one channel sounding feedback message based on the at least one SRS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 9 is a table illustrating transmit and receive beam configurations, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
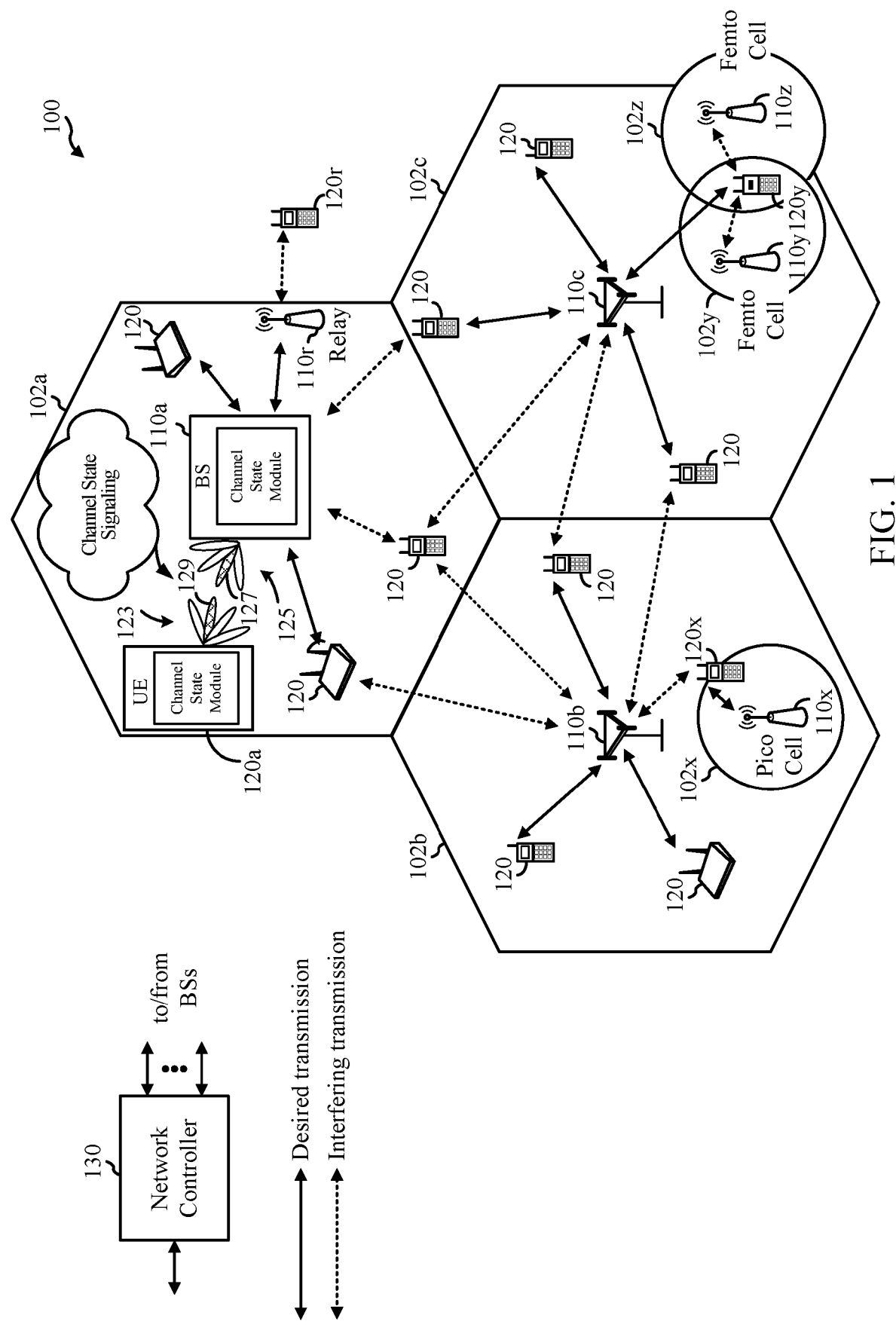
FIG. 1 is a block diagram conceptually illustrating an example telecommunications system, in accordance with certain aspects of the present disclosure.

Aspects of the present disclosure provide apparatus, methods, processing systems, and computer readable mediums for channel state feedback operations using full-duplex communication. For example, CSI-RS and SRS transmissions from gNB and UE, respectively, may be simultaneous via full-duplex resources. As used herein, the CSI-RS and SRS transmission(s) or reception(s) are considered to be simultaneous if any portion of the CSI-RS and the SRS are transmitted or received using the same resource (e.g., received using the same time and in the same frequency band), such as a full-duplex slot, as will be described in more detail herein. For example, the CSI-RS and SRS transmission may be within the same band. Certain aspects of the present disclosure provide techniques for a UE to measure channel quality information (CQI) in the presence of self-interference caused by SRS transmission. For example, the UE may perform a beam sweep during SRS transmission, to reduce self-interference. In certain aspects, the gNB may also compute CSI information based on SRS transmission in the UL, as described in more detail herein.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. As shown in FIG. 1, a user equipment (UE), such as the UE 120 in the wireless communication network 100 communicates with a serving base station (BS), such as the BS 110a in a cell 102a in the wireless communication network 100. The UE 120 may be configured with multiple transmission configurations (e.g., antenna arrays/panels and/or beams) for uplink transmission to the BS 110a.

In certain aspects, the BS 110a (e.g., gNB) and the UE 120 may perform channel state feedback operations using full-duplex communication. For example, CSI-RS and SRS transmissions from the BS 110a and the UE 120, respectively, may be simultaneous via full-duplex resources. Certain aspects of the present disclosure provide techniques for the UE 120 to measure CQI in the presence of self-interference caused by SRS transmission. For example, the UE may perform a beam sweep during SRS transmission, to reduce self-interference. In certain aspects, the gNB may also compute CSI information based on SRS transmission in the UL, as described in more detail herein. For example, the BS 110a may be transmit CSI-RS using multiple transmit beams 125 and may receive feedback from the UE allowing the BS to select one beam 127 to be used for communication with the UE. In certain aspects, the UE may also perform a sweep of receive beams 123 and select one beam 129 to be used for reception from the BS.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
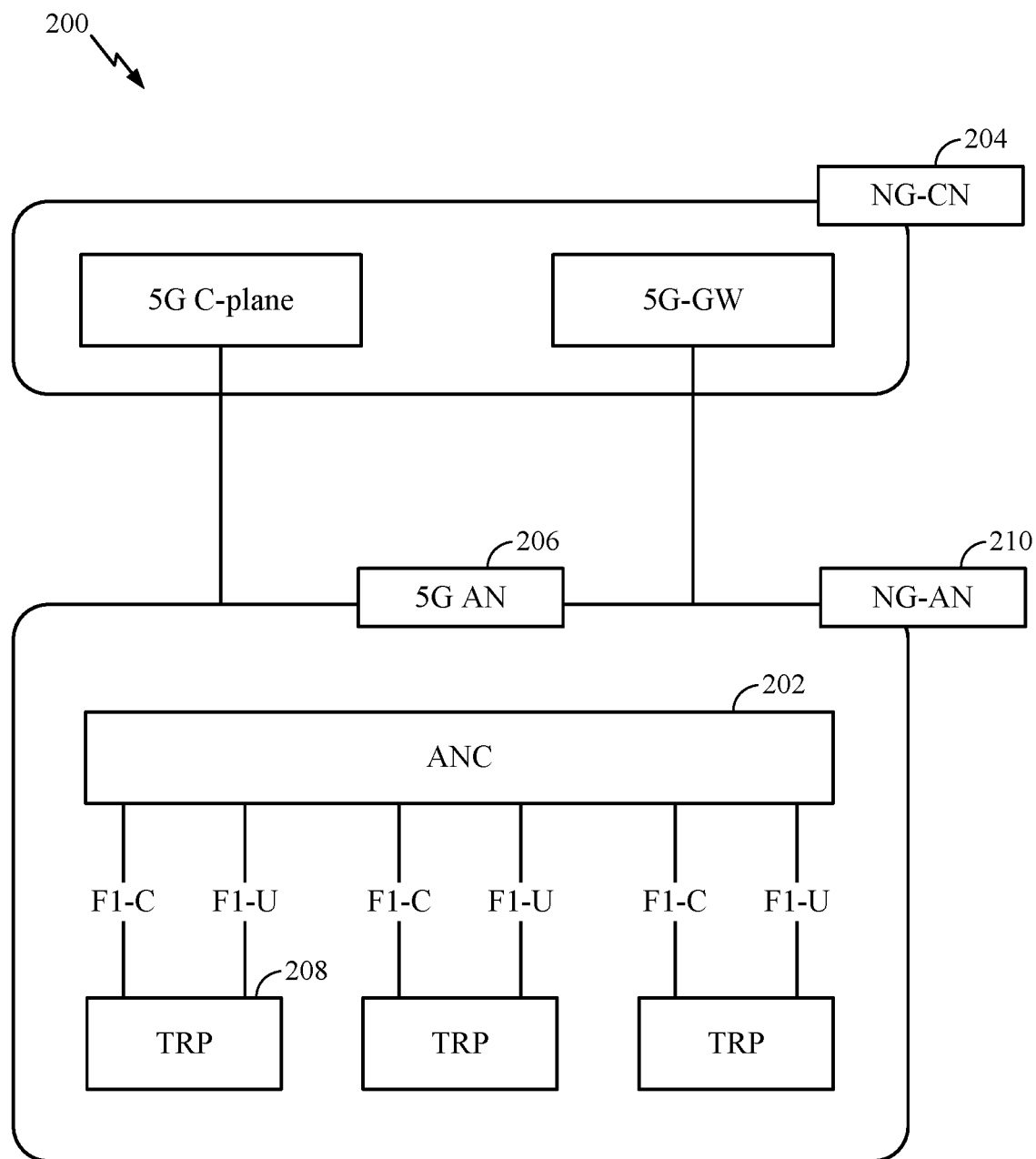
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
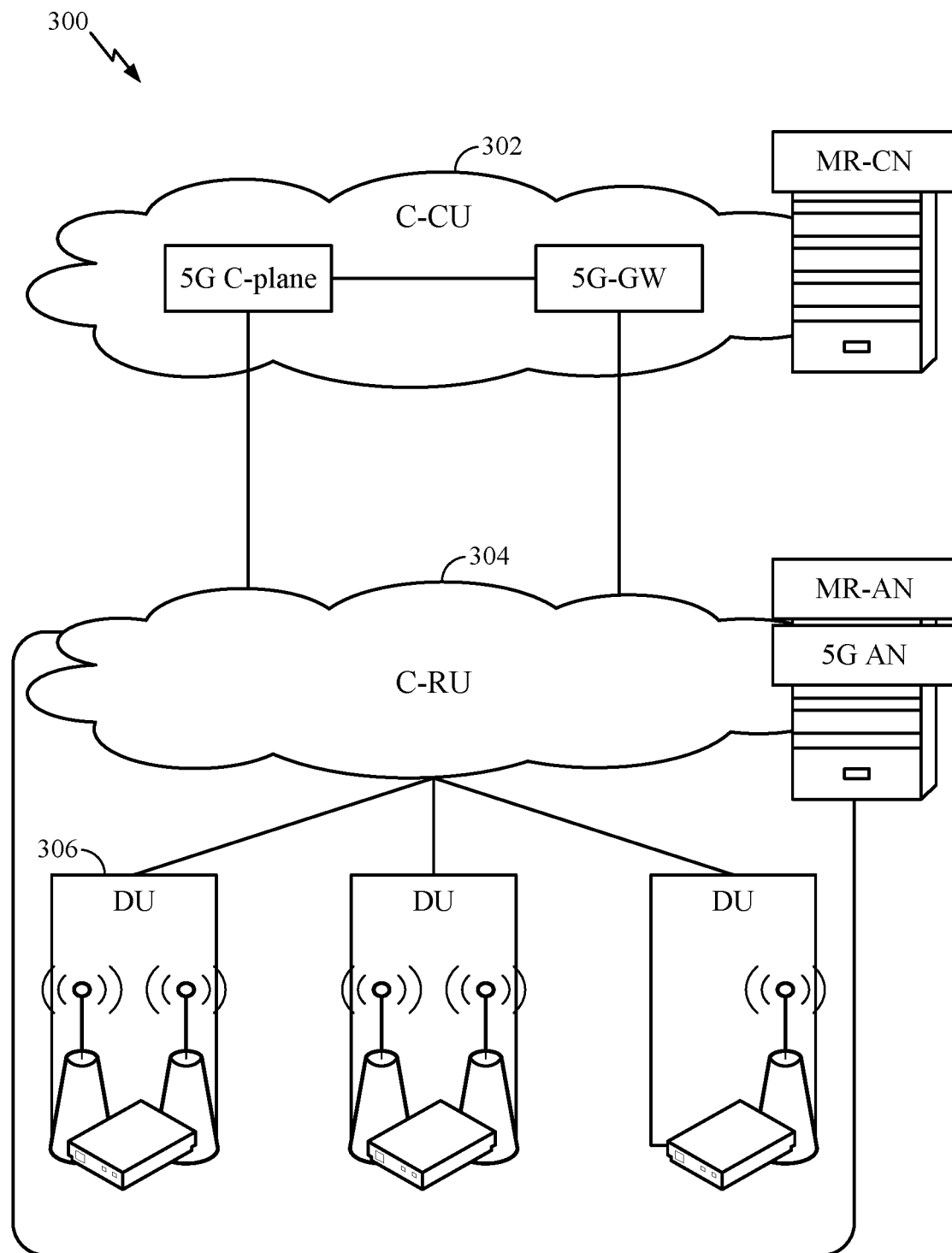
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
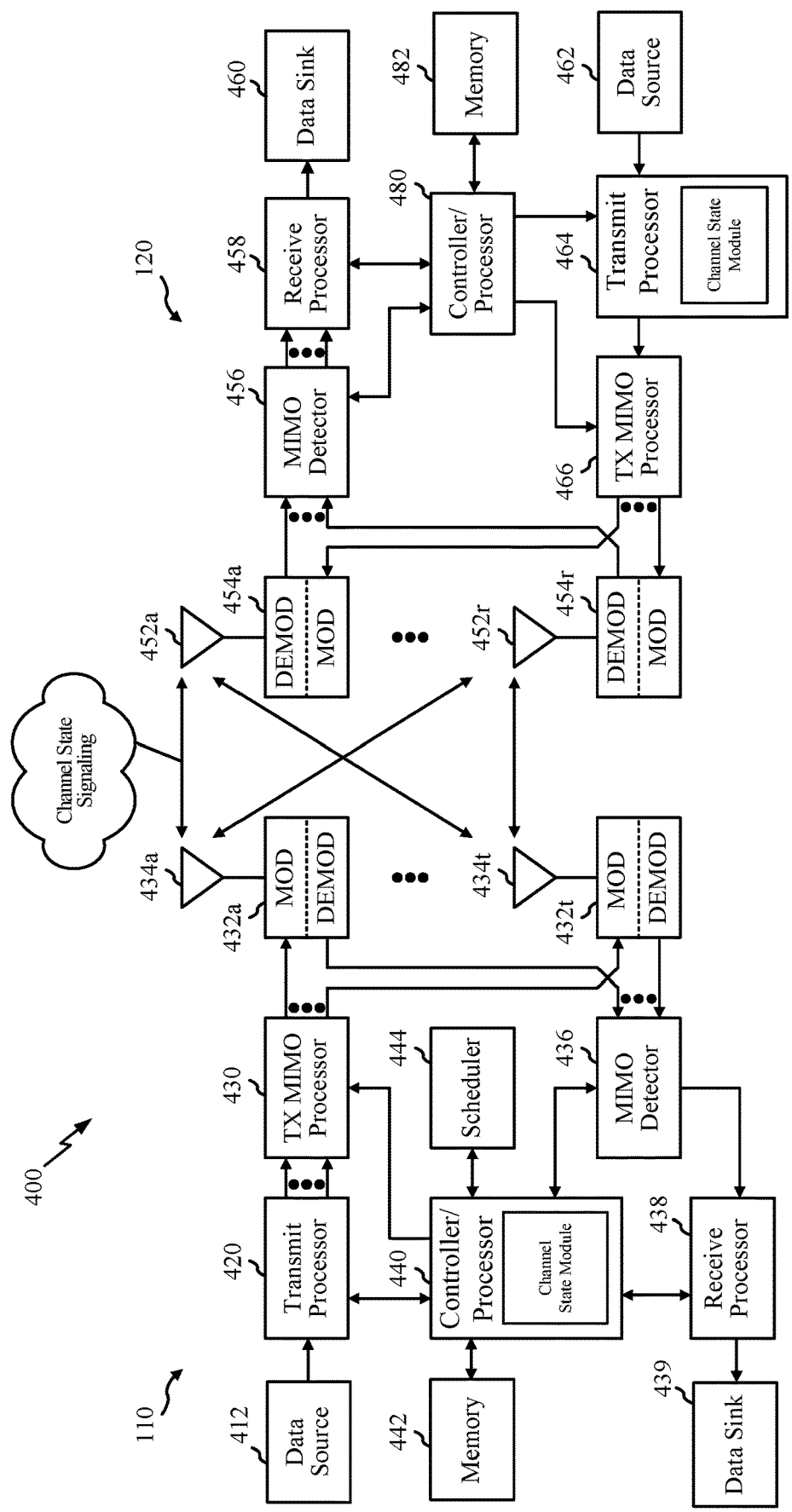
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. As shown in FIG. 4, the transmit processor 464 has a channel state module that may perform channel state operations via full-duplex resources, as described in more detail herein.

At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. For example, as shown in FIG. 4, the processor 440 has a channel state module that may perform channel state operations via full-duplex resources, as described in more detail herein. The memories 442 and 482 may store data and program codes for BS 110 and UE 120, respectively. A scheduler 444 may schedule UEs for data transmission on the downlink and/or uplink.

Figure 5:
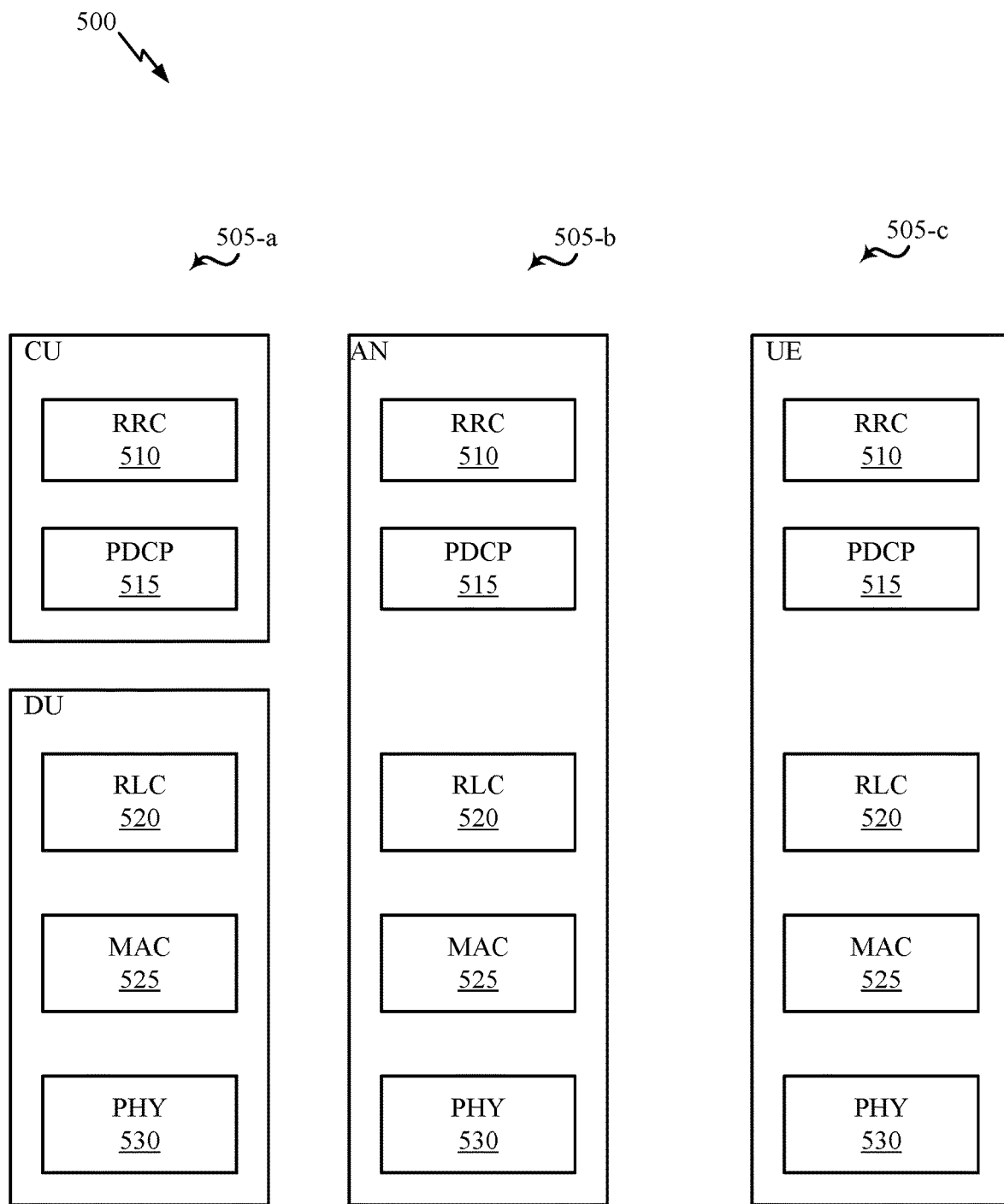
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
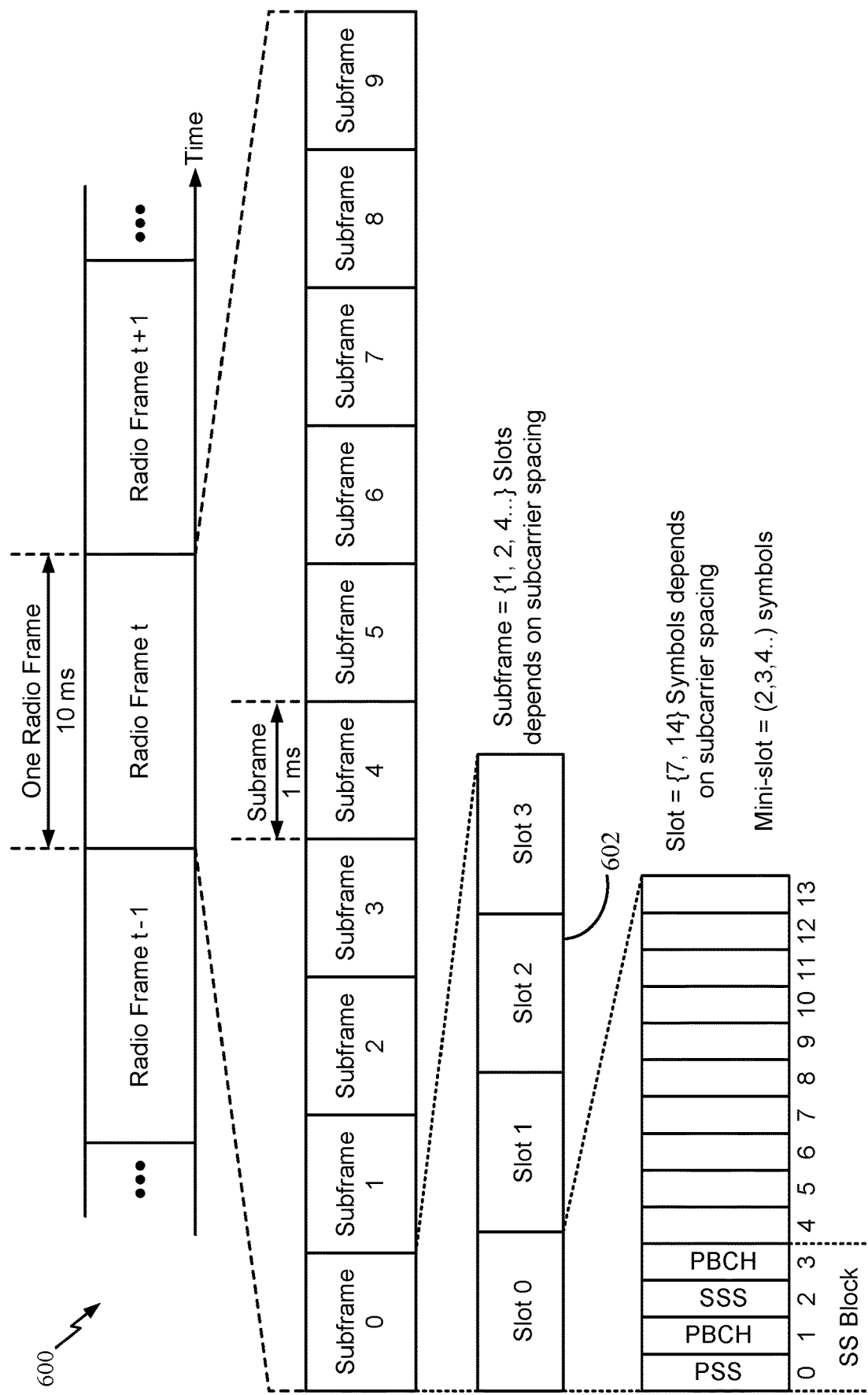
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). In certain aspects of the present disclosure, one or more slots (e.g., slot 602) of a frame may be a full-duplex slot configured for simultaneous transmissions of sounding reference signal (SRS) and channel state information (CSI)-reference signal (RS) between a UE and BS, as described in more detail therein.

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within a radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Techniques for Channel State Feedback for Link Adaptation with Full-Duplex Communication In certain systems, full-duplex communication may be implemented to allow simultaneous reception and transmission of signals. Full-duplex communication may increase throughput and reduce latency in communication. Currently in time division duplexing (TDD) configuration during up-link (UL) slots, downlink (DL) signal may not be received. For latency enhancement, these slots may be configured with simultaneous DL and UL signaling. Moreover, if sufficient isolation is present between DL and UL, then additional capacity may be realized via full-duplex communication. Certain aspects of the present disclosure provide techniques for channel quality indicator (CQI) computation and beam training enhancements for full-duplex communication.

Currently, channel state feedback computation is based on DL reference signal (RS) in downlink (DL) slots at a user-equipment (UE). With full-duplex communication for accurate computation, sounding reference signal (SRS) may be transmitted during channel state information-reference signal (CSI-RS) transmission. Certain aspects of the present disclosure are directed to simultaneous transmission of SRS and CSI-RS, enabling accurate channel state feedback (CSF) computation. For example, a UE may measure CQI in the presence of self-interference caused by SRS transmission. In certain aspects, a base station (e.g., gNB) may also compute CSI information based on SRS transmission in the UL, as described in more detail herein.

Figure 7:
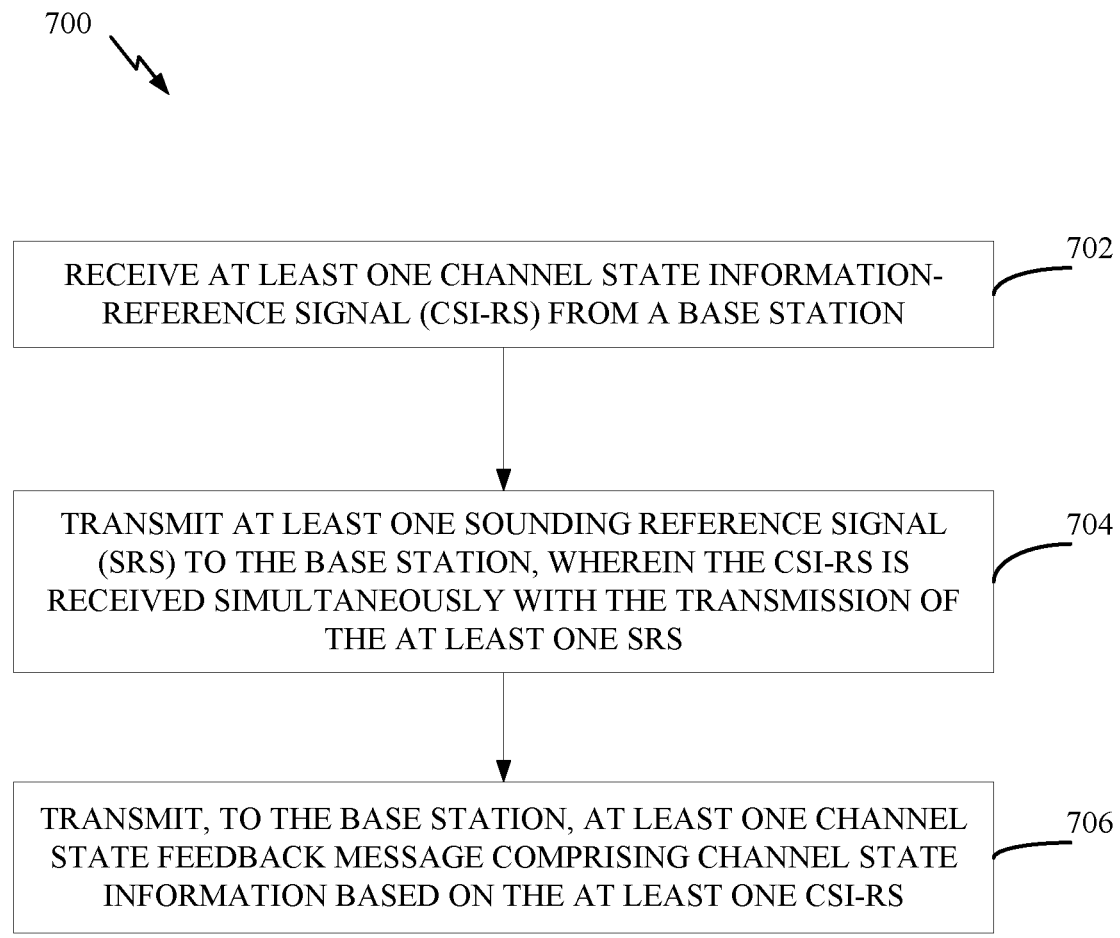
FIG. 7 is a flow diagram illustrating example operations by a UE for wireless communication, in accordance with certain aspects of the present disclosure.

FIG. 7 is a flow diagram illustrating example operations 700 for wireless communication, in accordance with certain aspects of the present disclosure. The operations 700 may be performed by a UE, such as the UE 120.

Operations 700 may be implemented as software components that are executed and run on one or more processors (e.g., controller/processor 480 of FIG. 2). Further, the transmission and reception of signals by the UE in operations 700 may be enabled, for example, by one or more antennas (e.g., antennas 452 of FIG. 4). In certain aspects, the transmission and/or reception of signals by the UE may be implemented via a bus interface of one or more processors (e.g., controller/processor 480) obtaining and/or outputting signals.

The operations 700 begin, at block 702, with the UE receiving at least one CSI-RS from a base station, and at block 704, transmitting at least one sounding reference signal (SRS) to the base station. In certain aspects, the CSI-RS is received simultaneously with the transmission of the at least one SRS. At block 706, the UE transmits, to the base station, at least one channel state feedback message comprising channel state information based on the at least one CSI-RS.

Figure 8:
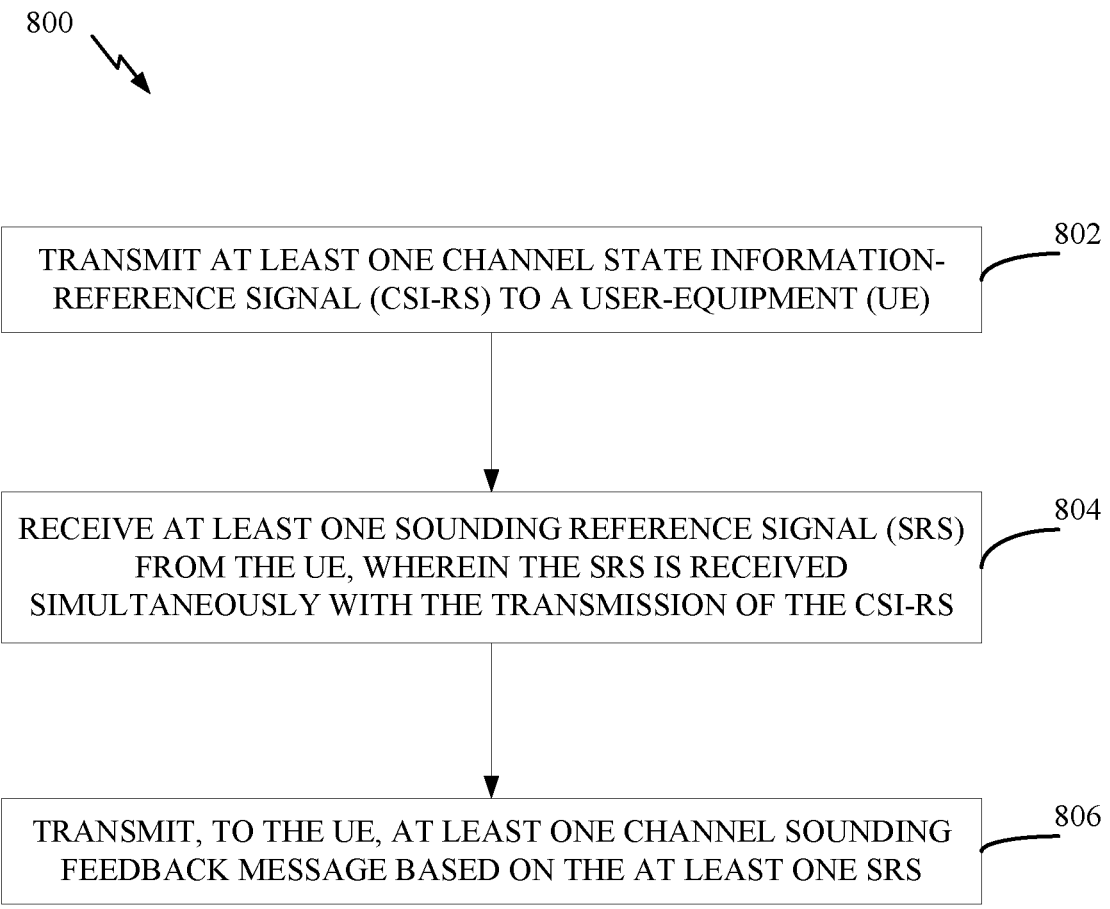
FIG. 8 is a flow diagram illustrating example operations by a BS for wireless communication, in accordance with certain aspects of the present disclosure.

FIG. 8 is a flow diagram illustrating example operations 800 for wireless communication, in accordance with certain aspects of the present disclosure. The operations 800 may be performed by a base station (e.g., gNB), such as the base station 110.

Operations 800 may be implemented as software components that are executed and run on one or more processors (e.g., controller/processor 440 of FIG. 4). Further, the transmission and reception of signals by the BS in operations 800 may be enabled, for example, by one or more antennas (e.g., antennas 234 of FIG. 4). In certain aspects, the transmission and/or reception of signals by the BS may be implemented via a bus interface of one or more processors (e.g., controller/processor 440) obtaining and/or outputting signals.

The operations 800 begin, at block 802, with the BS transmitting at least one CSI-RS to a UE, and at block 804, receiving at least one SRS from the UE. In certain aspects, the SRS is received simultaneously with the transmission of the CSI-RS. At block 806, the BS transmits, to the UE, at least one channel sounding feedback message based on the at least one SRS.

In other words, certain resources may be full-duplex and certain resources may be non-full-duplex. Thus, the base station may configure a UE to report CSF for these resources (e.g., transmit a request message to the UE to report CSF for full-duplex and/or non-full-duplex resources). For instance, some slots may have full-duplex operation and a base station may request that the UE report CSF based on the CSI-RS transmitted in these full-duplex slots. Certain other slots may be used for CQI computation without full-duplex operation. In some cases, the base station may configure the UE to report CSF using both CSI-RS transmitted via full-duplex resources (e.g., simultaneously with SRS transmission) and CSI-RS transmitted via non-full-duplex resources. In certain aspects, new CQI reporting modes may be implemented incorporating full-duplex operation. Moreover, a new codebook may be implemented for full-duplex operation.

Certain aspects provide techniques for reducing self-interference, which may be caused by the transmission of SRS. For example, the UE and base station may perform P2 and P3 beamforming operations in the presence of UL transmission (e.g., of SRS) causing interference to the UE itself, as described in more detail with respect to FIG. 9. P2 beamforming operation generally refers to beam refinement at the BS side involving a BS beam sweep. P3 beam refinement operations generally refers to beam refinement by a UE involving a UE beam sweep.

FIG. 9 is a table 900 illustrating transmit and receive beam configurations, in accordance with certain aspects of the present disclosure. For example, the CSI-RS transmit beam of the base station, the CSI-RS receive beam of the UE, and the SRS transmit beam of the UE, may be fixed for CQI computation, as illustrated. In some cases, the base station CSI-RS transmit beam may be refined, while the UE CSI-RS receive beam and the SRS receive beam are fixed. In other words, P2 beamforming operations may be performed using full-duplex resources, resulting in fixed self-interference at the UE caused by the SRS transmission. For example, a plurality of CSI-RSs may be transmitted in different directions corresponding to a plurality of beams. The UE may then select one of the plurality of beams (e.g., based on a corresponding signal quality of each beam). The base station may then use the selected beam (e.g., the beam received at the UE with the highest quality) of the plurality of beams when communicating with the UE in full-duplex mode. The selected beam may be indicated in a channel state feedback message (e.g., channel state feedback message in block 706 of FIG. 7).

Certain aspects provide techniques for CSF for a MIMO system. A MIMO system is implemented using multiple antennas on the transmitter side and the receiver side. Different data streams may be transmitted in parallel from different transmit antennas and multiple receive antennas may be used to separate the different data streams. A base station may send multiple data streams to a UE. The number of streams for a downlink transmission is referred to as "the rank".

In certain aspects of the present disclosure, the beam selected by the UE and fed back to the base station may be selected as a function of rank. For example, for rank 1, a UE may select and feedback a first P2 beam with a fixed SRS beam (e.g., in order to fix self-interference), but for rank 2, the UE may select and feedback a second P2 beam that is different than the first P2 beam. In general, the UE may report different beam pair combinations for different ranks.

As another example, for rank 1, the UE may determine a P2 beam considering only one stream, but for rank 2, the UE may consider two streams and select the best beam taking into account the channel quality for both streams. For instance, the UE may select a BS transmit beam that is receiving the least interference from the UE's SRS transmission beam with one stream. But for rank 2, the UE may determine the best BS transmit beam across two streams. In other words, a first beam may be determined by the UE to be the best for a first stream (for rank 1), but a second beam may be determined by the UE to be the best when considering both the first stream and a second streams (for rank 2). Thus, the UE may feedback the first beam for rank 1, and the second beam for rank 2.

In certain aspects, the UE CSI-RS receive beam may be refined (P3 refinement), while the base station CSI-RS transmit beam and the SRS receive beam are fixed, increasing signal to noise ratio (SNR), while reducing interference. In certain aspects, the UE may sweep and refine the UE SRS transmit beam, while the base station CSI-RS transmit beam and the UE CSI-RS receive beam are fixed. In other words, the UE may sweep SRS to reduce self-interference. That is, the UE may transmit a plurality of SRSs in different directions corresponding to a plurality of beams, and receive, from the base station, an indication of a preferred SRS (e.g., SRS received with highest quality at the base station) of the plurality of SRSs from the base station to be used for data communication. Moreover, the base station may be signaled a subset of SRS resources/precoding matrix indicator (PMI). In other words, when SRS is beam swept for self-interference, the UE may feedback a subset of SRS resource indicators (SRIs)/precoders to the base station, and the base station may signal SRIs for the UE from this subset. In other words, the UE may sweep the SRS beams across a subset of configured SRIs. Based on the reception of the SRS sweep, the base station may select one or more of the SRIs and signal the selected SRI(s) to the UE to be used for data transmission. The UE may only use a subset of the SRIs because, for example, only certain SRIs may be implemented for full-duplex communication.

In certain aspects, both the UE CSI-RS receive beam and the UE SRS transmit beam may be refined, while the base station CSI-RS transmit beam is fixed, for joint optimization of CSI-RS receive beam and SRS transmit beam at the UE. In certain aspects, the base station CSI-RS transmit beam may be refined/swept, along with refinement of the UE SRS transmit beam or the refinement of the UE CSI-RS receive beam. In certain aspects, to support the beamforming combinations described with respect to FIG. 9, joint optimization mode may be implemented for SRS and CSI-RS. For instance, the BS may fix the transmit beam to be the same for N slots/time occasions. The UE may then select its CSI-RS receive beam and SRS transmit beam for training. For instance, in a first few slots, the UE may keep the CSI-RS receive beam fixed and sweep the SRS transmit beam, or keep the SRS transmit beam fixed and sweep the CSI-RS receive beam. As an example, in a first time occasion, the UE may select CSI-RS receive beam 3, SRS transmit beam 2, and measure signal quality for the selected beams. After measuring signal quality, the UE may change the SRS transmit beam to beam 3, and CSI-RS receive beam to beam 4, and measure signal quality. This may be performed for all CSI-RS receive beams and SRS transmit beams in order for the UE to select the best CSI-RS receive beam and the SRS transmit beam. In this manner, the UE may jointly optimize the CSI-RS receive beam and SRS transmit beam. While FIG. 9 provides several example use cases to facilitate understanding, other suitable use cases may be possible for the transmit and receive beam configurations described herein.

Figure 10:
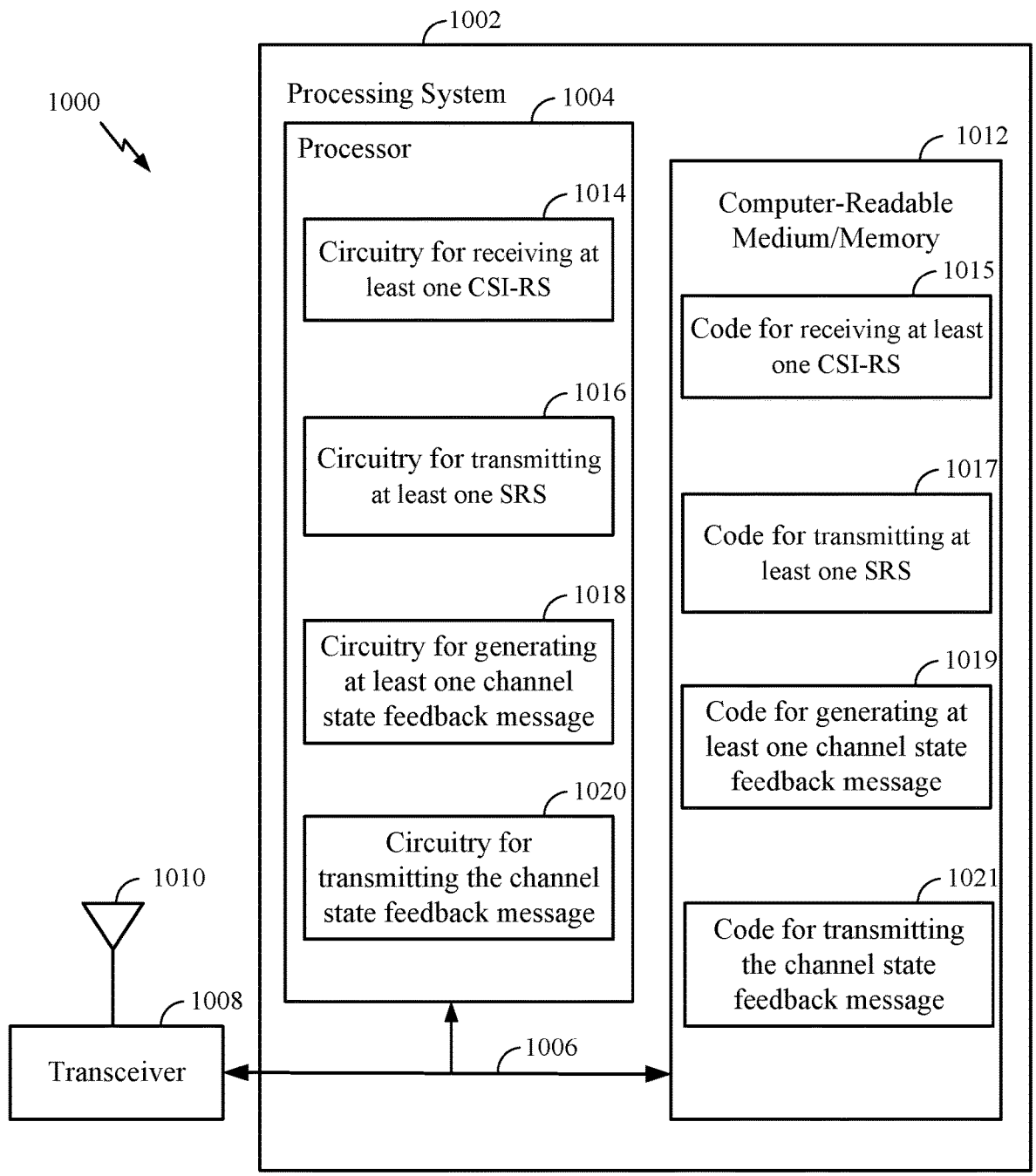
FIG. 10 illustrates a communications device that may include various components configured to perform operations for the techniques disclosed herein.

FIG. 10 illustrates a communications device 1000 that may include various components (e.g., corresponding to means-plus-function components) configured to perform operations for the techniques disclosed herein, such as the operations illustrated in FIG. 7. The communications device 1000 includes a processing system 1002 coupled to a transceiver 1008. The transceiver 1008 is configured to transmit and receive signals for the communications device 1000 via an antenna 1010, such as the various signals as described herein, for example, for transmitting uplink transmissions with different transmission configuration. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 7, or other operations for performing the various techniques discussed herein for interference control for uplink transmission. In certain aspects, computer-readable medium/memory 1012 stores code 1015 for receiving at least one CSI-RS, code 1017 for transmitting at least one SRS, code 1019 for generating at least one channel state feedback message, and code 1021 for transmitting the channel state feedback message. In certain aspects, the processor 1004 has circuitry configured to implement the code stored in the computer-readable medium/memory 1012. The processor 1004 includes circuitry 1014 for receiving at least one CSI-RS, circuitry 1016 for transmitting at least one SRS, circuitry 1018 for generating at least one channel state feedback message, and circuitry 1020 for transmitting the channel state feedback message.

Figure 11:
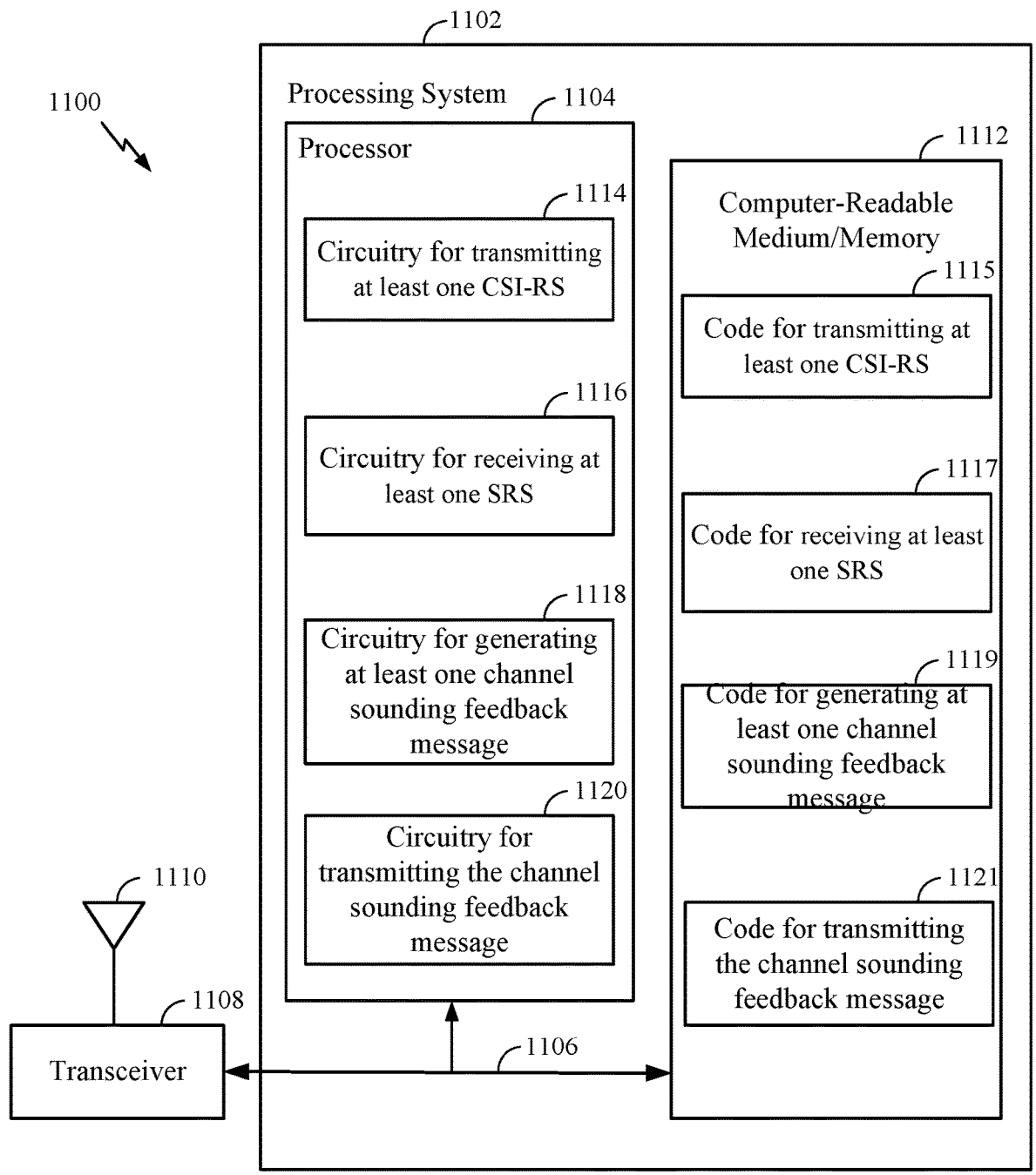
FIG. 11 illustrates a communications device that may include various components configured to perform operations for the techniques disclosed herein.

FIG. 11 illustrates a communications device 1100 that may include various components (e.g., corresponding to means-plus-function components) configured to perform operations for the techniques disclosed herein, such as the operations illustrated in FIG. 8. The communications device 1100 includes a processing system 1102 coupled to a transceiver 1108. The transceiver 1108 is configured to transmit and receive signals for the communications device 1100 via an antenna 1110, such as the various signals as described herein, for example, receiving uplink transmissions. The processing system 1102 may be configured to perform processing functions for the communications device 1100, including processing signals received and/or to be transmitted by the communications device 1100, such as interference control for uplink transmissions.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 8, or other operations for performing the various techniques discussed herein for interference control for uplink transmission. In certain aspects, computer-readable medium/memory 1112 stores code 1115 for transmitting at least one CSI-RS, code 1117 for receiving at least one SRS, code 1119 for generating at least one channel sounding feedback message, and code 1121 for transmitting the channel sounding feedback message. In certain aspects, the processor 1104 has circuitry configured to implement the code stored in the computer-readable medium/memory 1112. The processor 1104 includes circuitry 1114 for transmitting at least one CSI-RS, circuitry 1116 for receiving at least one SRS, circuitry 1118 for generating at least one channel sounding feedback message, and circuitry 1120 for transmitting the channel sounding feedback message.

Example Aspects

In a first aspect, a method for wireless communication includes receiving at least one channel state information-reference signal (CSI-RS) from a base station, transmitting at least one sounding reference signal (SRS) to the base station, wherein the CSI-RS is received simultaneously with the transmission of the at least one SRS, and transmitting, to the base station, at least one channel state feedback message comprising channel state information based on the at least one CSI-RS.

In a second aspect, in combination with the first aspect, the channel state information comprise channel quality information (CQI).

In a third aspect, in combination with one or more of the first aspect and the second aspect, the method may also include receiving a request from the base station to report the channel state feedback message based on the at least one CSI-RS received via full-duplex resources, wherein the at least one SRS is transmitted via the full-duplex resources.

In a fourth aspect, in combination with the third aspect, the full-duplex resources comprises a full-duplex slot.

In a fifth aspect, in combination with one or more of the third aspect and the fourth aspect, the method may also include receiving another CSI-RS via non-full-duplex resources, wherein the at least one channel state feedback message comprises CQI based on the other CSI-RS.

In a sixth aspect, in combination with one or more of the first aspect to the fifth aspect, the at least one CSI-RS comprises a plurality of CSI-RSs transmitted in different directions corresponding to a plurality of beams, the method further comprising selecting a beam of the plurality of beams, wherein the at least one channel state feedback message comprising an indication of the selected beam.

In a seventh aspect, in combination with the sixth aspect, selecting the beam of the plurality of beams comprises selecting different beams depending on a rank.

In an eighth aspect, in combination with one or more of the first aspect to the seventh aspect, the at least one CSI-RS is received via a plurality of receive beams, the method further comprising selecting a receive beam of the plurality of receive beams, and communicating data with the base station via the receive beam.

In a ninth aspect, in combination with one or more of the first aspect to the eighth aspect, the at least one SRS comprises a plurality of SRSs transmitted in different directions corresponding to a plurality of beams, the method further comprising receiving an indication of a preferred SRS of the plurality of SRSs from the base station, and communicating data with the base station via a beam of the plurality of beams corresponding to the preferred SRS.

In a tenth aspect, in combination with one or more of the first aspect to the ninth aspect, the method may also include transmitting a subset of SRS resource indicators (SRIs) to the base station, the at least one SRS being transmitted in accordance with the subset of SRIs, receiving an indication of a SRI of the subset of SRIs from the base station, and communicating data with the base station in accordance with the SRI.

In an eleventh aspect, a method for wireless communication, includes transmitting at least one CSI-RS to a user-equipment (UE), receiving at least one SRS from the UE, wherein the SRS is received simultaneously with the transmission of the CSI-RS, and transmitting, to the UE, at least one channel sounding feedback message based on the at least one SRS.

In a twelfth aspect, in combination with the eleventh aspect, the method may also include transmitting a request to the UE to report channel state feedback based on the at least one CSI-RS transmitted via full-duplex resources, wherein the at least one SRS is received via the full-duplex resources.

In a thirteenth aspect, in combination with the twelfth aspect, the method may also include receiving the channel state feedback from the UE after transmitting the request.

In a fourteenth aspect, in combination with one or more of the twelfth aspect and thirteenth aspect, the full-duplex resources comprises a full-duplex slot.

In a fifteenth aspect, in combination with one or more of the twelfth aspect to the fourteenth aspect, the method may also include transmitting another CSI-RS via non-full-duplex resources, wherein the channel state feedback comprises channel quality information (CQI) based on the other CSI-RS.

In a sixteenth aspect, in combination with one or more of the twelfth aspect to the fifteenth aspect, the at least one CSI-RS comprises a plurality of CSI-RSs transmitted in different directions corresponding to a plurality of beams, wherein the channel state feedback comprising an indication of a preferred beam of the plurality of beams.

In a seventeenth aspect, in combination with one or more of the twelfth aspect to the sixteenth aspect, the method may also include receive a subset of SRS resource indicators (SRIs) from the UE, the method further comprising selecting an SRI of the subset of SRIs based on the at least one SRS, and transmitting an indication of the SRI to the UE.

In an eighteenth aspect, an apparatus for wireless communication may include a memory and a processor coupled to the memory, the processor and the memory being configured to receive at least one CSI-RS from a base station, transmit at least one SRS to the base station, wherein the CSI-RS is received simultaneously with the transmission of the at least one SRS, and transmit, to the base station, at least one channel state feedback message comprising channel state information based on the at least one CSI-RS.

In a nineteenth aspect, in combination with the eighteenth aspect, the channel state information comprise CQI.

In a twentieth aspect, in combination with one or more of the eighteenth aspect to the nineteenth aspect, the processor and the memory may also be further configured to receive a request from the base station to report the channel state feedback message based on the at least one CSI-RS received via full-duplex resources, wherein the at least one SRS is transmitted via the full-duplex resources.

In a twenty-first aspect, in combination with the twentieth aspect, the full-duplex resources comprises a full-duplex slot.

In a twenty-second aspect, in combination with one or more of twentieth aspect to the twenty-first aspect, the processor is further configured to receive another CSI-RS via non-full-duplex resources, wherein the at least one channel state feedback message comprises CQI based on the other CSI-RS.

In a twenty-third aspect, in combination with one or more of the eighteenth aspect to the twenty-second aspect, the at least one CSI-RS comprises a plurality of CSI-RSs transmitted in different directions corresponding to a plurality of beams, the processor and the memory being further configured to select a beam of the plurality of beams, wherein the at least one channel state feedback message comprising an indication of the selected beam.

In a twenty-fourth aspect, in combination with the twenty-third aspect, the processor and the memory are configured to select the beam of the plurality of beams by selecting different beams depending on a rank.

In a twenty-fifth aspect, in combination with one or more of the eighteenth aspect to the twenty-fourth aspect, the at least one CSI-RS is received via a plurality of receive beams, the processor and the memory being further configured to select a receive beam of the plurality of receive beams, and communicate data with the base station via the receive beam.

In a twenty-sixth aspect, in combination with one or more of the eighteenth aspect to the twenty-fifth aspect, the at least one SRS comprises a plurality of SRSs transmitted in different directions corresponding to a plurality of beams, the processor and the memory being further configured to receive an indication of a preferred SRS of the plurality of SRSs from the base station, and communicate data with the base station via a beam of the plurality of beams corresponding to the preferred SRS.

In a twenty-seventh aspect, in combination with one or more of the eighteenth aspect to the twenty-sixth aspect, the processor and the memory may be further configured to transmit a subset of SRIs to the base station, the at least one SRS being transmitted in accordance with the subset of SRIs, receive an indication of a SRI of the subset of SRIs from the base station, and communicate data with the base station in accordance with the SRI.

In a twenty-eighth aspect, an apparatus for wireless communication may include a memory and a processor coupled to the memory, the memory and the processing being configured to transmit at least one CSI-RS to a user-equipment (UE), receive at least one SRS from the UE, wherein the SRS is received simultaneously with the transmission of the CSI-RS, and transmit, to the UE, at least one channel sounding feedback message based on the at least one SRS.

In a twenty-ninth aspect, in combination with the twenty-eighth aspect, the processor and the memory are further configured to transmit a request to the UE to report channel state feedback based on the at least one CSI-RS transmitted via full-duplex resources, wherein the at least one SRS is received via the full-duplex resources.

In a thirtieth aspect, in combination with the twentieth-ninth aspect, the processor and the memory may be further configured to receive the channel state feedback from the UE after transmitting the request.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 7 and FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication, comprising:
   receiving at least one channel state information-reference signal (CSI-RS) from a base station;
   transmitting at least one sounding reference signal (SRS) to the base station, wherein the at least one CSI-RS is received simultaneously with the transmission of the at least one SRS, wherein at least a portion of the at least one CSI-RS is received at a same time as at least a portion of the transmission of the at least one SRS; and
   transmitting, to the base station, at least one channel state feedback message comprising channel state information based on the at least one CSI-RS.

2. The method of claim 1, wherein the channel state information comprises channel quality information (CQI).

3. The method of claim 1, further comprising receiving a request from the base station to report the channel state feedback message based on the at least one CSI-RS received via full-duplex resources, wherein the at least one SRS is transmitted via the full-duplex resources.

4. The method of claim 3, wherein the full-duplex resources comprise a full-duplex slot.

5. The method of claim 3, further comprising receiving another CSI-RS via non-full-duplex resources, wherein the at least one channel state feedback message comprises channel quality information (CQI) based on the other CSI-RS.

6. The method of claim 1, wherein the at least one CSI-RS comprises a plurality of CSI-RSs transmitted in different directions corresponding to a plurality of beams, the method further comprising selecting a beam of the plurality of beams, wherein the at least one channel state feedback message comprising an indication of the selected beam.

7. The method of claim 6, wherein selecting the beam of the plurality of beams is based on a rank.

8. The method of claim 1, wherein the at least one CSI-RS is received via a plurality of receive beams, the method further comprising:
   selecting a receive beam of the plurality of receive beams; and
   communicating data with the base station via the receive beam.

9. The method of claim 1, wherein the at least one SRS comprises a plurality of SRSs transmitted in different directions corresponding to a plurality of beams, the method further comprising:
receiving an indication of a preferred SRS of the plurality of SRSs from the base station; and
communicating data with the base station via a beam of the plurality of beams corresponding to the preferred SRS.

10. The method of claim 1, further comprising:
transmitting a subset of SRS resource indicators (SRIs) to the base station, the at least one SRS being transmitted in accordance with the subset of SRIs;
receiving an indication of an SRI of the subset of SRIs from the base station; and
communicating data with the base station in accordance with the SRI.

11. A method for wireless communication, comprising:
transmitting at least one channel state information-reference signal (CSI-RS) to a user-equipment (UE);
receiving at least one sounding reference signal (SRS) from the UE, wherein the at least one SRS is received simultaneously with the transmission of the at least one CSI-RS, wherein at least a portion of the at least one SRS is received at a same time as at least a portion of the transmission of the at least one CSI-RS; and
transmitting, to the UE, at least one channel sounding feedback message based on the at least one SRS.

12. The method of claim 11, further comprising transmitting a request to the UE to report channel state feedback based on the at least one CSI-RS transmitted via full-duplex resources, wherein the at least one SRS is received via the full-duplex resources.

13. The method of claim 12, further comprising receiving the channel state feedback from the UE after transmitting the request.

14. The method of claim 12, wherein the full-duplex resources comprise a full-duplex slot.

15. The method of claim 12, further comprising transmitting another CSI-RS via non-full-duplex resources, wherein the channel state feedback comprises channel quality information (CQI) based on the other CSI-RS.

16. The method of claim 12, wherein the at least one CSI-RS comprises a plurality of CSI-RSs transmitted in different directions corresponding to a plurality of beams, the channel state feedback comprising an indication of a preferred beam of the plurality of beams.

17. The method of claim 12, further comprising receiving a subset of SRS resource indicators (SRIs) from the UE, the method further comprising selecting an SRI of the subset of SRIs based on the at least one SRS, and transmitting an indication of the SRI to the UE.

18. An apparatus for wireless communication, comprising:
a memory; and
a processor coupled to the memory, the processor and the memory being configured to:
receive at least one channel state information-reference signal (CSI-RS) from a base station;
transmit at least one sounding reference signal (SRS) to the base station, wherein the at least one CSI-RS is received simultaneously with the transmission of the at least one SRS, wherein at least a portion of the at least one CSI-RS is received at a same time as at least a portion of the transmission of the at least one SRS; and
transmit, to the base station, at least one channel state feedback message comprising channel state information based on the at least one CSI-RS.

19. The apparatus of claim 18, wherein the channel state information comprises channel quality information (CQI).

20. The apparatus of claim 18, wherein the processor and the memory are further configured to receive a request from the base station to report the channel state feedback message based on the at least one CSI-RS received via full-duplex resources, wherein the at least one SRS is transmitted via the full-duplex resources.

21. The apparatus of claim 20, wherein the full-duplex resources comprise a full-duplex slot.

22. The apparatus of claim 20, wherein the processor and the memory are further configured to receive another CSI-RS via non-full-duplex resources, wherein the at least one channel state feedback message comprises channel quality information (CQI) based on the other CSI-RS.

23. The apparatus of claim 18, wherein the at least one CSI-RS comprises a plurality of CSI-RSs transmitted in different directions corresponding to a plurality of beams, the processor and the memory being further configured to select a beam of the plurality of beams, the at least one channel state feedback message comprising an indication of the selected beam.

24. The apparatus of claim 23, wherein the processor and the memory are configured to select the beam of the plurality of beams based on a rank.

25. The apparatus of claim 18, wherein the at least one CSI-RS is received via a plurality of receive beams, the processor and the memory being further configured to:
select a receive beam of the plurality of receive beams; and
communicate data with the base station via the receive beam.

26. The apparatus of claim 18, wherein the at least one SRS comprises a plurality of SRSs transmitted in different directions corresponding to a plurality of beams, the processor and the memory being further configured to:
receive an indication of a preferred SRS of the plurality of SRSs from the base station; and
communicate data with the base station via a beam of the plurality of beams corresponding to the preferred SRS.

27. The apparatus of claim 18, wherein the processor and the memory are further configured to:
transmit a subset of SRS resource indicators (SRIs) to the base station, the at least one SRS being transmitted in accordance with the subset of SRIs;
receive an indication of an SRI of the subset of SRIs from the base station; and
communicate data with the base station in accordance with the SRI.

28. An apparatus for wireless communication, comprising:
a memory; and
a processor coupled to the memory, the processor and the memory being configured to:
transmit at least one channel state information-reference signal (CSI-RS) to a user-equipment (UE);
receive at least one sounding reference signal (SRS) from the UE, wherein the SRS is received simultaneously with the transmission of the at least one CSI-RS, wherein at least a portion of the at least one SRS is received at a same time as at least a portion of the transmission of the at least one CSI-RS; and
transmit, to the UE, at least one channel sounding feedback message based on the at least one SRS.

29. The apparatus of claim 28, wherein the processor and the memory are further configured to transmit a request to the UE to report channel state feedback based on the at least one CSI-RS transmitted via full-duplex resources, wherein the at least one SRS is received via the full-duplex resources.

30. The apparatus of claim 29, wherein the processor and the memory are further configured to receive the channel state feedback from the UE after transmitting the request.

31. An apparatus for wireless communication, comprising:
    means for receiving at least one channel state information-reference signal (CSI-RS) from a base station;
    means for transmitting at least one sounding reference signal (SRS) to the base station, wherein the at least one CSI-RS is received simultaneously with the transmission of the at least one SRS, wherein at least a portion of the at least one CSI-RS is received at a same time as at least a portion of the transmission of the at least one SRS; and
    means for transmitting, to the base station, at least one channel state feedback message comprising channel state information based on the at least one CSI-RS.

32. A non-transitory computer-readable medium comprising executable instructions that, when executed by one or more processors of an apparatus, cause the apparatus to:
    receive at least one channel state information-reference signal (CSI-RS) from a base station;
    transmit at least one sounding reference signal (SRS) to the base station, wherein the at least one CSI-RS is received simultaneously with the transmission of the at least one SRS, wherein at least a portion of the at least one CSI-RS is received at a same time as at least a portion of the transmission of the at least one SRS; and
    transmit, to the base station, at least one channel state feedback message comprising channel state information based on the at least one CSI-RS.

33. An apparatus for wireless communication, comprising:
    means for transmitting at least one channel state information-reference signal (CSI-RS) to a user-equipment (UE);
    means for receiving at least one sounding reference signal (SRS) from the UE, wherein the at least one SRS is received simultaneously with the transmission of the at least one CSI-RS, wherein at least a portion of the at least one SRS is received at a same time as at least a portion of the transmission of the at least one CSI-RS; and
    means for transmitting, to the UE, at least one channel sounding feedback message based on the at least one SRS.

34. A non-transitory computer-readable medium comprising executable instructions that, when executed by one or more processors of an apparatus, cause the apparatus to:
    transmit at least one channel state information-reference signal (CSI-RS) to a user-equipment (UE);
    receive at least one sounding reference signal (SRS) from the UE, wherein the at least one SRS is received simultaneously with the transmission of the at least one CSI-RS, wherein at least a portion of the at least one SRS is received at a same time as at least a portion of the transmission of the at least one CSI-RS; and
    transmit, to the UE, at least one channel sounding feedback message based on the at least one SRS.

\* \* \* \* \*